(12) United States Patent
Arya

(10) Patent No.: US 6,765,761 B2
(45) Date of Patent: Jul. 20, 2004

(54) SWAGELESS MOUNT PLATE OR UNIMOUNT ARM BASED MILLIACTUATED SUSPENSION

(75) Inventor: Satya Prakash Arya, San Jose, CA (US)

(73) Assignee: International Business Machines Corp., Armonk, NY (US)

( * ) Notice: Subject to any disclaimer, the term of this patent is extended or adjusted under 35 U.S.C. 154(b) by 182 days.

(21) Appl. No.: 10/131,520

(22) Filed: Apr. 24, 2002

(65) Prior Publication Data

US 2003/0202286 A1 Oct. 30, 2003

(51) Int. Cl.[7] .................................................. G11B 5/48
(52) U.S. Cl. ........................ 360/244.7; 360/244.5; 360/244.8; 360/294.4
(58) Field of Search ........................ 360/244.2, 244.3, 360/244.5, 244.7, 244.8, 294.1, 294.3, 294.4

(56) References Cited

U.S. PATENT DOCUMENTS

| | | | |
|---|---|---|---|
| 5,759,418 A | * 6/1998 | Frater et al. ................... 216/22 |
| 5,764,444 A | * 6/1998 | Imamura et al. ......... 360/294.4 |
| 5,898,544 A | 4/1999 | Krinke et al. ............... 360/104 |
| 5,943,189 A | 8/1999 | Boutaghou et al. ......... 360/103 |
| 5,946,164 A | * 8/1999 | Tracy ....................... 360/244.5 |
| 5,966,269 A | * 10/1999 | Marek et al. ............. 360/244.3 |
| 6,021,023 A | * 2/2000 | Hillman .................... 360/244.7 |
| 6,052,251 A | 4/2000 | Mohajerani et al. ..... 360/78.05 |
| 6,108,175 A | 8/2000 | Hawwa et al. ........... 360/294.4 |
| 6,115,223 A | 9/2000 | Berg et al. ............... 360/294.4 |
| 6,157,522 A | 12/2000 | Murphy et al. .......... 360/294.6 |
| 6,215,622 B1 | 4/2001 | Ruiz et al. ................ 360/244.3 |
| 6,215,629 B1 | 4/2001 | Kant et al. .................... 360/290 |
| 6,233,124 B1 | * 5/2001 | Budde et al. ............. 360/294.4 |
| 6,268,983 B1 | * 7/2001 | Imada et al. ............. 360/244.3 |
| 6,331,923 B1 | * 12/2001 | Mei ......................... 360/294.4 |
| 6,362,938 B1 | * 3/2002 | Suzuki et al. ............ 360/294.4 |
| 6,392,844 B1 | * 5/2002 | Summers ................. 360/245.5 |
| 6,469,869 B1 | * 10/2002 | Vera ........................ 360/244.5 |
| 6,487,055 B1 | * 11/2002 | Mei ......................... 360/294.4 |
| 6,504,683 B1 | * 1/2003 | Imai et al. ............... 360/244.5 |
| 6,532,138 B1 | * 3/2003 | Koganezawa ............ 360/294.4 |
| 6,614,627 B1 | * 9/2003 | Shimizu et al. .......... 360/294.4 |
| 6,624,982 B2 | * 9/2003 | Masuda et al. .......... 360/294.4 |
| 6,653,761 B2 | * 11/2003 | Fujii et al. .................. 310/333 |
| 6,661,619 B2 | * 12/2003 | Nishida et al. .......... 360/294.4 |
| 2001/0033452 A1 | * 10/2001 | Koganezawa et al. ... 360/77.02 |
| 2003/0123196 A1 | * 7/2003 | Shiraishi et al. ......... 360/294.4 |
| 2003/0202293 A1 | * 10/2003 | Nakamura et al. ....... 360/294.4 |

* cited by examiner

Primary Examiner—Jefferson Evans
(74) Attorney, Agent, or Firm—Walter W. Duft

(57) ABSTRACT

A milliactuated disk drive suspension assembly includes a mount plate, a functional end for supporting a transducer-carrying slider, a hinge disposed between the mount plate and the functional end, and a sway compliant region on the mount plate adapted to facilitate displacement of the functional end in a trackwise sway direction relative to the mount plate. A pair of milliactuators can be mounted to span the compliant region in a closely spaced arrangement to develop maximum mechanical advantage between a milliactuator actuating stroke and a transducer sway stroke. The mount plate is free of swage mounting features and is mounted to a disk drive actuator arm using a swageless interconnection that allows the milliactuators to be closely spaced so as to improve their mechanical advantage.

33 Claims, 8 Drawing Sheets

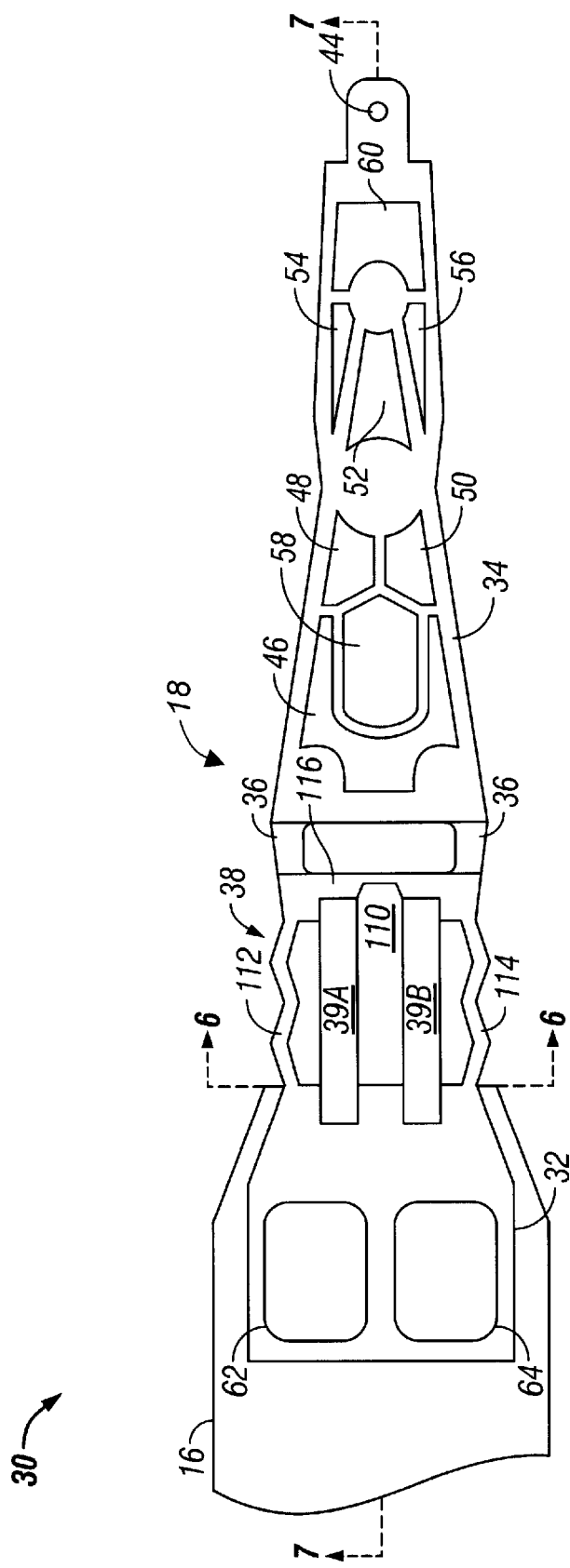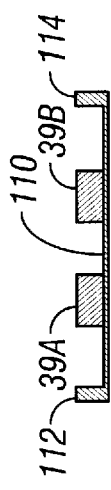

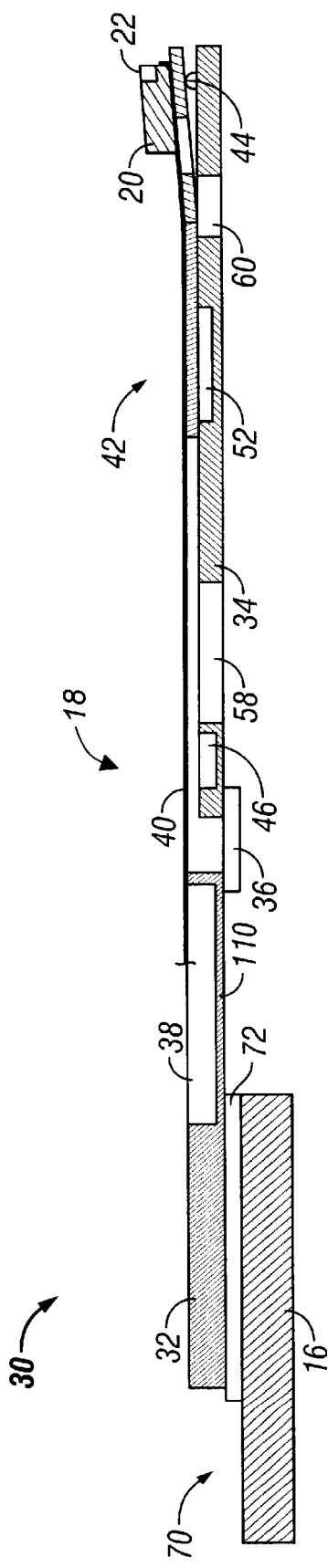
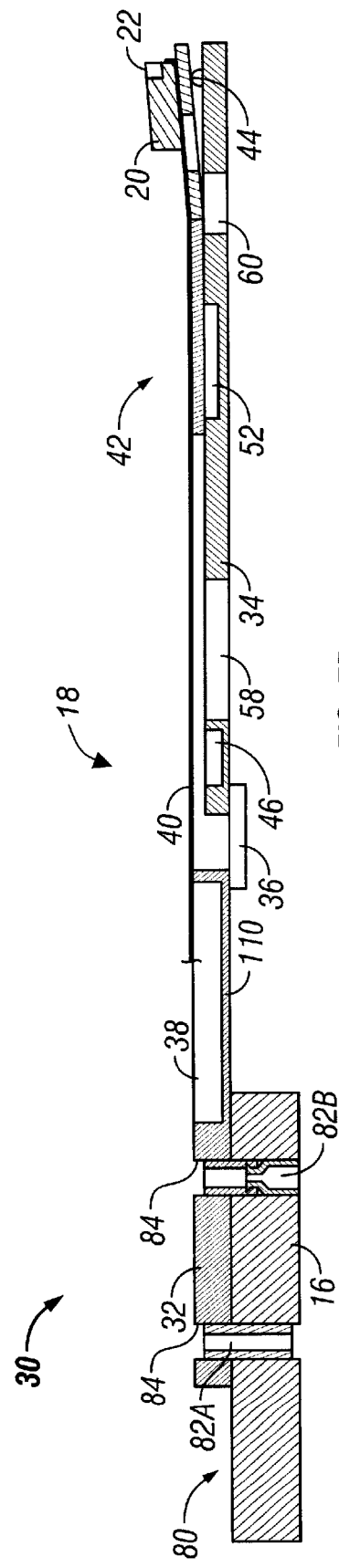
FIG. 7A
FIG. 7B

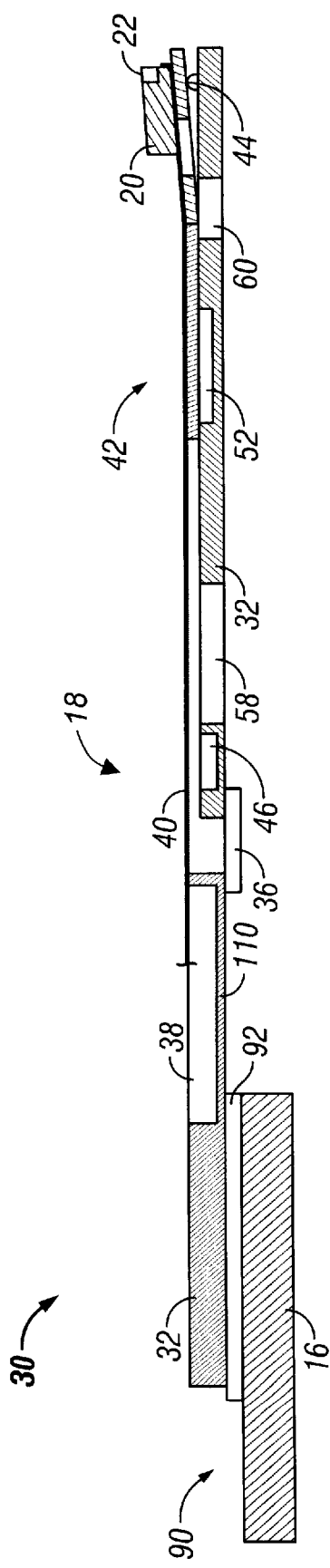
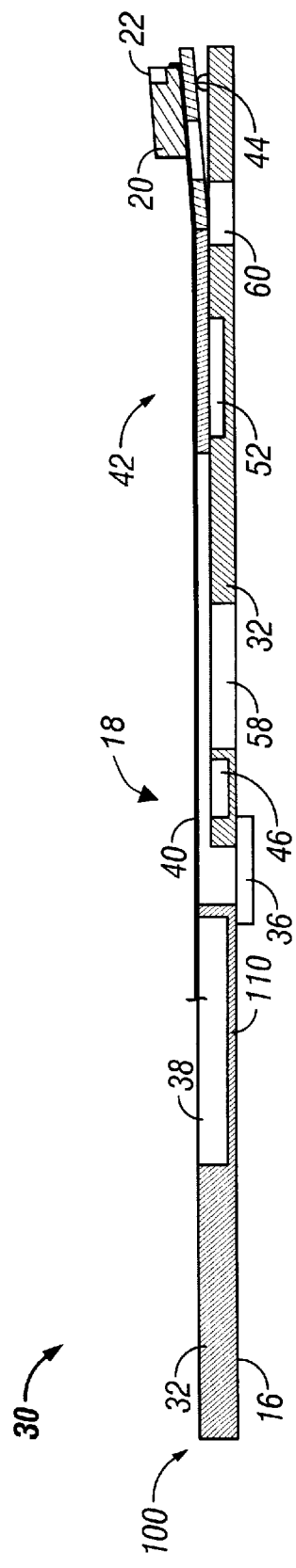
FIG. 7C
FIG. 7D

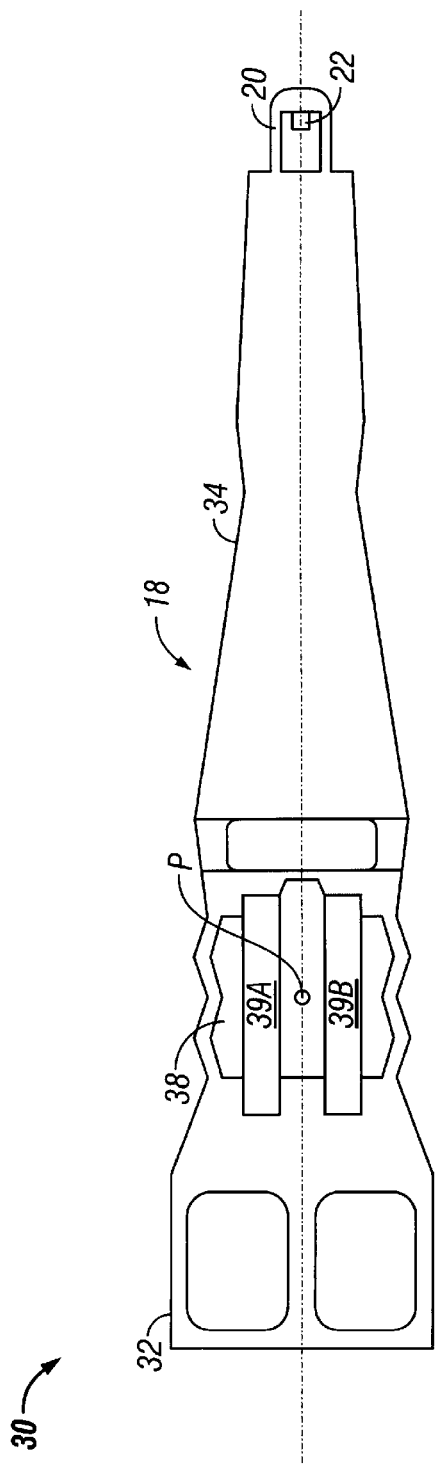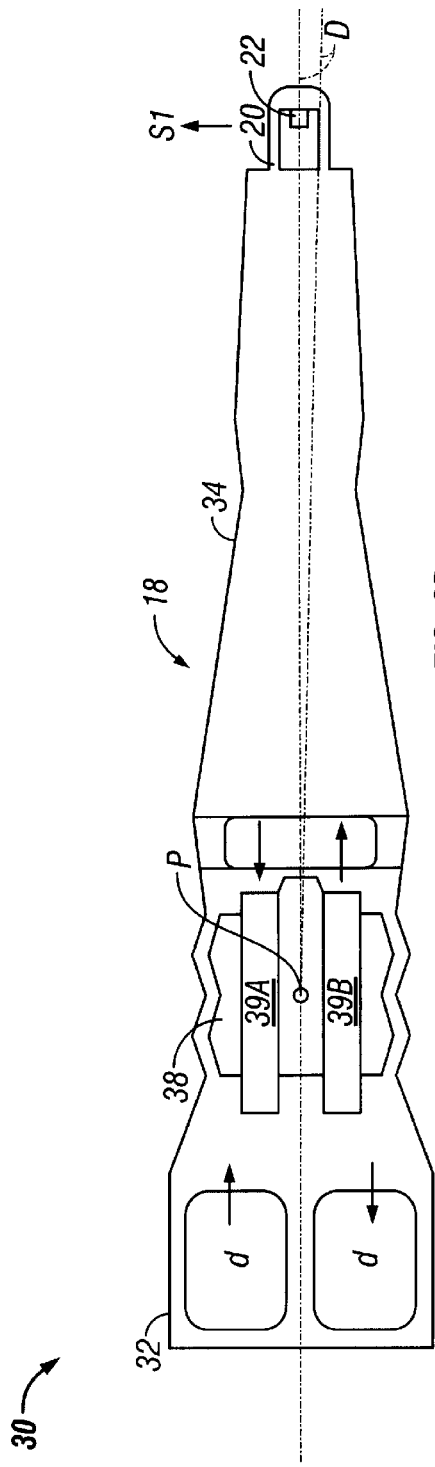

SWAGELESS MOUNT PLATE OR UNIMOUNT ARM BASED MILLIACTUATED SUSPENSION

BACKGROUND OF THE INVENTION

1. Field of the Invention

The present invention relates to data storage apparatus for magnetically reading and writing information on data storage media. More particularly, the invention concerns milliactuated suspensions designed to carry read/write heads in magnetic disk drive storage devices.

2. Description of the Prior Art

By way of background, a read/write head in a magnetic disk drive storage device ("disk drive") is typically incorporated on an air bearing slider that is designed to fly closely above the surface of a spinning magnetic disk medium during drive operation. The slider is mounted to the free end of a suspension that in turn is cantilevered from the arm of a rotary actuator mounted on a stationary pivot shaft. The actuator is driven by a rotary voice coil motor that, when energized, causes the actuator to rotate and thereby sweep the actuator arm and its attached suspension across the disk surface. By controlling the rotational movement of the actuator via the voice coil motor, the read/write head can be selectively positioned over the surface of the magnetic disk medium, allowing it to read and write data in a series of concentric tracks.

Recent years have seen an increase in TPI (Tracks Per Inch) recording density requirements in order to meet the demand for increased data storage capacity. This has necessitated greater track positioning resolution than is possible using voice coil motor control alone. One solution to the foregoing problem has been to mount a pair of small piezoelectric elements of opposite polarization to the mount plate end of the suspension. The piezoelectric elements are usually oriented in a spaced parallel arrangement, but that is not always the case. When energized, the piezoelectric elements impart small sway (i.e., across-track) displacements to the suspension. This causes the read/write head mounted at the free end of the suspension to move several tracks in either direction from its nominal position, depending on the polarity of the energy that drives the piezoelectric elements. Very fine track positioning resolution can be obtained in this fashion. Moreover, because the response time of the piezoelectric elements is generally much less than that of the voice coil motor, the seek and settle latency associated with data storage and retrieval operations can be reduced in situations where the read/write head only needs to move a few (e.g., 1–4) tracks at a time.

The aforementioned piezoelectric elements are sometimes referred to as "microactuators." However, the term "milliactuator" is perhaps more appropriate in order to distinguish such elements from another type of electrostatic actuator that is mounted directly under, or near, the slider. This latter type of electrostatic actuator, known as a "microactuator," has a smaller range of movement (e.g., 1–2 tracks) than the "milliactuator" elements described above. Due to their location under or near the slider, however, microactuators have better dynamic characteristics than milliactuators, which are located near the suspension hinge. The present invention concerns piezoelectric elements of the milliactuator type that are mounted in proximity to the suspension hinge.

Current disk drive suspensions tend to be about 11–18 mm in length. With the trend toward ever increasing data densities, future designs will see suspension lengths shorter than 11 mm or less. This presents a problem relative to prior art milliactuator systems. Because a disk drive suspension is normally swage-mounted to its associated actuator arm, it usually has a relatively large swage hole at its mount plate end to receive a connecting swage spud. In order to maintain adequate clearance with respect to the swage hole, the milliactuators must either be spaced longitudinally therefrom, or they must have a relatively wide lateral spacing that is in excess of the swage hole diameter. Spacing the milliactuators longitudinally from the swage hole is not a viable option in a suspension of short length. Locating the milliactuators with a wide lateral spacing is also problematic because wide milliactuator spacing means reduced sway stroke displacement at the suspension free end for a given milliactuator stroke length. A short suspension length tends to further aggravate this condition.

FIG. 1 is illustrative. It shows a suspension S that has two parallel milliactuators M1 and M2. The milliactuators M1 and M2 are spaced from each other by a distance of 2*r, where "r" is the distance from each milliactuator to a pivot point "P" about which the suspension pivots due to milliactuator actuation. A distance "R" exists between a read/write transducer T and the pivot point P. It will be seen that the stroke length "d" that the milliactuators M1 and M2 must be displaced in order to achieve a sway stroke offset "D" at the read/write transducer T is approximated (for small angular displacements) by the relationship d=(r*D)/R. Note that an increase in "r" or a decrease in "R" will result in a larger stroke length "d" that the milliactuators must displace to achieve a given sway stroke offset D.

One solution to the foregoing problem would be to increase the length of the milliactuators to give them a greater actuating stroke length. However, this could increase the mass and inertia of the suspension to the point of impacting one or more operational characteristics, such as the suspension's track servoing bandwidth capability. Moreover, a longer milliactuator stroke length would introduce undesirable dynamic arm torsion bending and sway mode gains when the milliactuators are excited.

Accordingly, a need exists for a suspension design solution that facilitates the effective use of milliactuators to increase track positioning resolution in disk drive suspensions of reduced length. Preferably, this solution will not increase the mass and inertia of the suspension and will avoid introducing undesirable dynamic characteristics such as excessive gain in the suspension's torsion and sway modes.

SUMMARY OF THE INVENTION

The foregoing problems are solved and an advance in the art is obtained by an improved milliactuated disk drive suspension assembly designed to support a transducer-carrying slider above a spinning data storage medium designed to store data in a series of concentric data tracks. According to preferred implementations of the invention, the suspension assembly includes a suspension having a mount plate, a functional end for supporting the slider, a hinge disposed between the mount plate and the functional end, and a sway compliant region on the mount plate. The compliant region is adapted to facilitate displacement of the functional end in a sway direction relative to the mount plate, such that the slider moves trackwise relative the data storage medium. A pair of milliactuators can be mounted on the suspension so as to span the compliant region. The suspension is attached via its mount plate to the arm of a pivotable actuator. The mount plate is free of swage mounting features and is secured to the actuator arm using a swageless interconnection, thus allowing the milliactuators to be closely spaced so as to improve their mechanical advantage.

In one embodiment of the invention, the swageless interconnection is provided by an adhesive bond. In an other embodiment of the invention, the swageless interconnection is provided by a snap connection. In still another embodiment of the invention, the swageless interconnection includes a damping system provided by a viscoelastic film disposed between the mount plate and the actuator arm. In yet another embodiment of the invention, the swageless interconnection is provided by the mount plate being integral with the actuator arm to provide a unimount arm configuration.

The milliactuators are preferably positioned to provide at least a ten-fold mechanical advantage between a milliactuator actuating stroke and a transducer sway stroke. The transducer sway stroke offset is preferably at least about 1 micron on each side of a nominal position of the transducer so as to provide a trackwise adjustment capability of about four tracks at 100,000 TPI (Tracks Per Inch). The milliactuators can be positioned in a mutually parallel relationship or otherwise. In a suspension having a shortened length of about 11 millimeters, the milliactuators are preferably spaced from each other by a distance of about 1 millimeter.

The invention further contemplates a method for making a suspension assembly as summarized above, and a disk drive that incorporates the suspension assembly therein.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 5 is a plan view of a milliactuated suspension assembly constructed in accordance with the invention;

FIG. 6 is a cross-sectional view taken along line 6—6 in FIG. 5;

FIGS. 7A, 7B, 7C and 7D are cross-sectional views taken along line 7—7 in FIG. 5 and illustrating alternative embodiments of a connection between a suspension and an actuator arm in the milliactuated suspension assembly of FIG. 5;

FIGS. 8A, 8B and 8C are diagrammatic plan view representations of a milliactuated suspension in accordance with the invention with FIG. 8A showing the suspension in a non-actuated position and FIGS. 8B and 8C showing the suspension in opposing actuated positions.

DETAILED DESCRIPTION OF PREFERRED EMBODIMENTS

Figure 2:
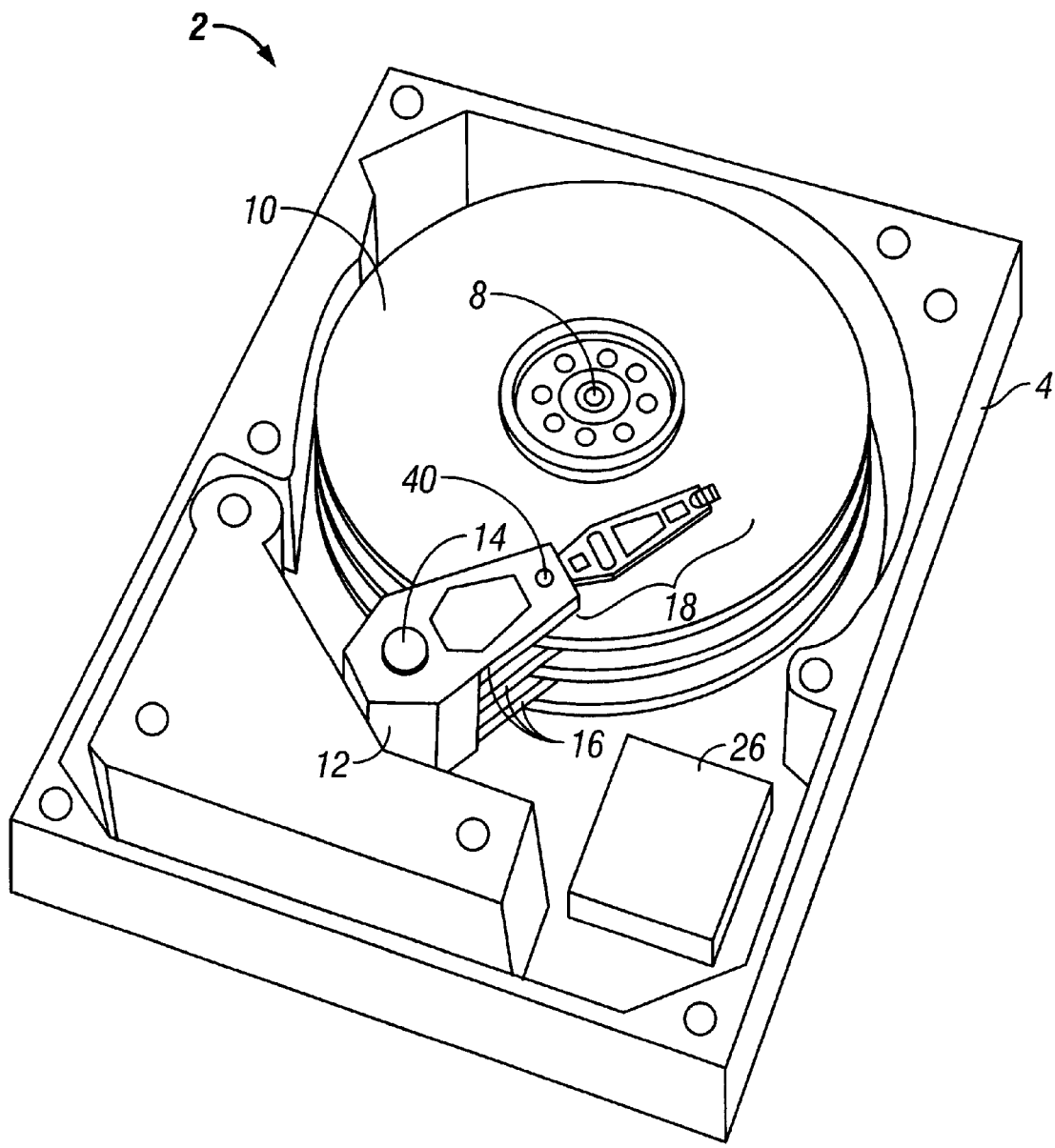
FIG. 2 is an interior perspective view of a magnetic disk drive that incorporates a read/write head suspension fabricated in accordance with the invention.
Figure 3:
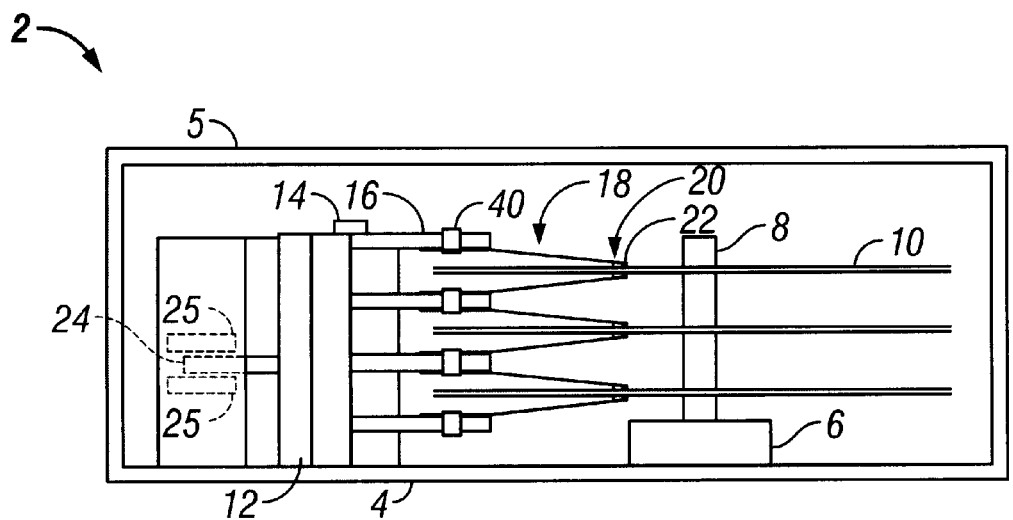
FIG. 3 is a simplified vertical sectional view of the magnetic disk drive of FIG. 2.
Figure 4:
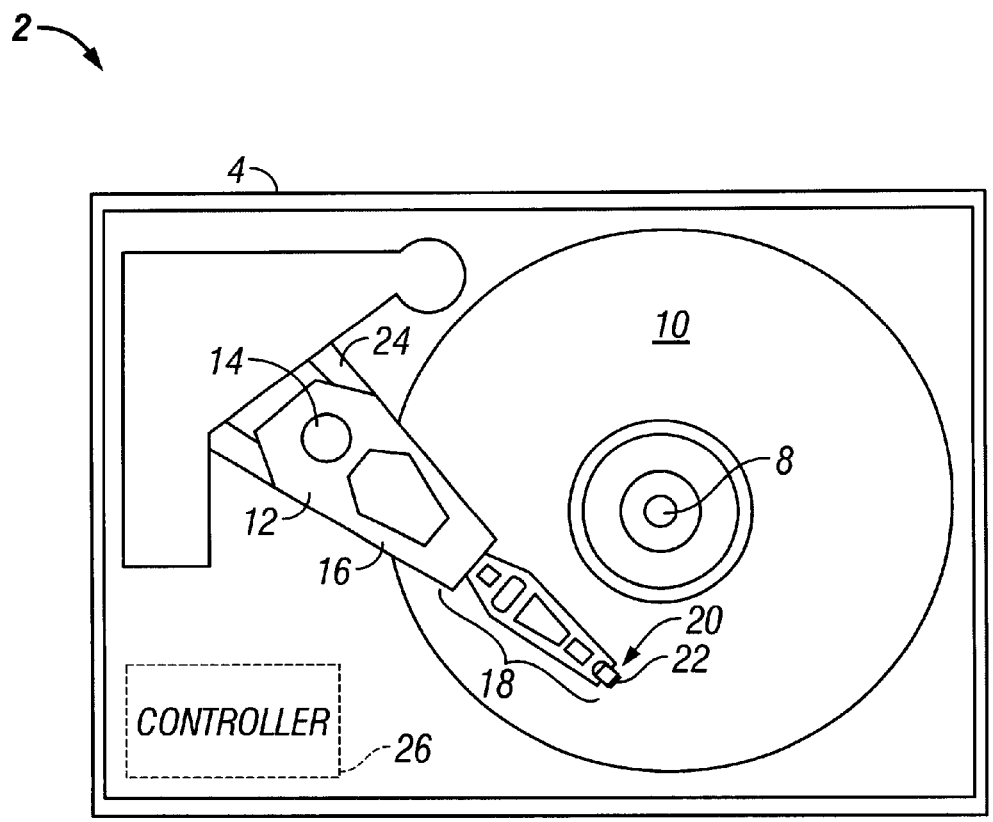
FIG. 4 is a simplified horizontal sectional view of the disk drive of FIG. 2.

Turning now to the figures, wherein like reference numerals represent like elements in all of the several views, FIGS. 2–4 illustrate a disk drive 2 that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes rigid actuator arms 16 that each carry one or two milliactuated suspensions 18. Each suspension 18 supports an air bearing slider 20 having a read/write transducer 22. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

There is preferably one transducer 22 associated with each of the upper and lower surfaces of the disks 10 (see FIG. 3), such that each disk surface is available for data storage. The transducers 22 are positionable to read and write data anywhere on the disk surfaces by pivoting the actuator 12 about the stationary pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 3 and 4) that is driven by a pair of motor magnets 25 (see FIG. 3).

When the disk drive 2 is powered on, the disks 10 will spin up to a desired rotational speed, such as 7400 rpm, 10,000 rpm or higher. This causes an upward air bearing force to develop between the disk surfaces and the sliders 20. The upward air bearing force is counteracted by the downward gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals, which carry both data and transducer position control information, are sent to the disk drive controller, shown diagrammatically at 26, for conventional processing. The controller 26 also generates write data signals during data write operations. The write data signals are delivered via circuitry carried by the actuator arms 16 and suspensions 18 to the write head elements of the transducers 22 for writing data onto the disks 10.

It will be appreciated that the foregoing description of the disk drive 2 is exemplary in nature, and that many other design configurations would be possible while still utilizing the suspension load beam manufacturing method of the invention.

In order to increase the disk drive's track positioning resolution beyond that which can be obtained from the voice coil motor winding 24 and the motor magnets 25 (see FIG. 3), each of the suspensions 18 is adapted for milliactuator based track positioning control according to the principles of the invention. FIG. 5 shows one such suspension 18 mounted on an actuator arm 16 to provide a combination that will hereinafter be referred to as a milliactuated suspension assembly 30. Before describing the suspension assembly 30 in more detail, it should be noted that the configuration thereof shown in FIG. 5 has been selected for purposes of illustration only and not by way of limitation. It will therefore be understood that other configurations would also be possible, depending on design considerations.

As can be seen in FIG. 5, the three principal components of the suspension 18 of the suspension assembly 30 are a mount plate 32, a functional end 34, and a hinge 36 disposed between the mount plate and the functional end. The suspension 18 further includes a sway compliant region 38 that forms part of the mount plate, and a pair of milliactuators 39A and 39B mounted so as to span the compliant region.

The functional end 34 and the hinge 36 can be formed in conventional fashion using any suitable material, with stainless steel being preferred. As is known in the art, the functional end 34 is designed to act as a relatively stiff load bearing structure that supports a system of electrical lead elements 40 and a flexure gimbal arrangement 42, both of which are shown in FIGS. 7A–7D. The flexure gimbal arrangement 42 carries one of the sliders 20 of FIGS. 3–4 with its associated read/write transducer 22. It will be appreciated that the flexure gimbal arrangement 42 and the functional end 34 can be separately constructed, or alternatively, they may be fabricated together as an integrated system. FIGS. 7A–7D illustrate configurations in which the flexure gimbal arrangement is separately formed and then mounted to the functional end using a welded connection or other suitable mounting arrangement. It will be seen that a dimple 44 is formed on the functional end 34 below the location of the slider 20. The dimple 44 provides a pivot point that facilitates pitch and roll movement of the slider 20 during drive operation.

As shown in FIG. 5, the functional end 34 can be formed with one or more mass reducing pockets and apertures, depending on dynamic design considerations. In FIG. 5, there are five mass reducing pockets 46, 48, 50, 52, 54 and 56, and two mass reducing apertures 58 and 60. These features can be formed using any suitable material removal technique, such as chemical etching.

The hinge 36 connects the functional end 34 to the mount plate 32. Its purpose is to provide a compliant bending section that allows the functional end 34 to load the slider 20 against the usual air bearing that develops between the slider and the underlying data storage medium 10 (see FIG. 4). The hinge 36 can be formed in any suitable configuration using any suitable construction technique. For example, the hinge 36 could be separately formed from the functional end 34 and the mount plate 32 and attached thereto by welding or any other suitable mounting arrangement. Alternatively, the hinge 36 could be integrally formed with either the functional end 34, the mount plate 32, or both.

The mount plate 32 can be formed using any suitable material, with stainless steel being preferred for the major load bearing portions thereof One or more mass reducing pockets can be added to provide desired dynamic characteristics. Two such pockets 62 and 64 are shown in FIG. 5. These features may be produced using any suitable material removal technique, such as chemical etching.

It will be observed that the mount plate 32 is characterized by an absence of swage mounting features as would normally be found in a conventional disk drive suspension. In particular, the mount plate 32 has no swage mounting hole and is attached to the actuator arm 16 by way of a swageless interconnection. Several alternative swageless interconnections are shown in FIGS. 7A–7D.

In FIG. 7A, a swageless interconnection 70 is provided by an adhesive bond 72 made from a suitable hard adhesive, such as epoxy cement. Note that by using hard adhesive, the swageless interconnection 70 should be strong enough to prevent the bonded region from moving relative to the actuator arm 16 in response to milliactuator action.

In FIG. 7B, a swageless interconnection 80 is provided by a pin or snap connection implemented using one or more split hollow pin connectors 82a or snap connectors 82b (one of each is shown in FIG. 7B). The connectors 82a and 82b are made from a suitable material, such as stainless steel. They should be flexible enough to deflect when installing the mount plate 32 on the actuator arm 16, but stiff enough to retain the mount plate 32 in position once it is secured on the actuator arm. Each connector 82a/82b can be mounted by insertion into corresponding holes 84 formed in both the mount plate 32 and the actuator arm 16. Alternatively, the connectors 82a/82b could be initially fixed to the mount plate 32 by bonding or welding and then inserted into corresponding holes 84 that are formed only in the actuator arm 16. Also, the upper end of each connector 82a/82b could include a lip (not shown) that is adapted to engage the upper surface of the mount plate 32 and retain it in position against the actuator arm 16.

In FIG. 7C, a swageless interconnection 90 includes a damping system provided by a viscoelastic film 92 disposed between the mount plate and the actuator arm. The viscoelastic film 92 can be formed from any suitable viscoelastic polymer. Its function is to help dampen torsion and sway mode vibrations in the suspension 18. Note that the viscoelastic film 92 is not necessarily an adhesive. Thus, it may not provide a complete connection between the mount plate 32 and the actuator arm 16, such that other attachment elements (not shown) may need to be added to complete the swageless interconnection 90.

In FIG. 7D, a swageless interconnection 100 is provided by the mount plate 32 being extend to form the actuator arm 16 to provide a unimount arm configuration. Note that this arrangement provides maximum design freedom relative to the length and location of the milliactuators 39A and 39B. It also provides the most rigid connection between the actuator arm 16 and the mount plate 32 in response to milliactuator action.

The sway compliant region 38 is disposed to form part of the mount plate 32 and is configured to facilitate displacement of the functional end 34 in a sway direction relative to the mount plate, such that the slider 20 moves trackwise relative the data storage medium 10 (see FIG. 3). It will be appreciated that the compliant region can be configured in many different ways depending on dynamic design requirements. FIGS. 5 and 6 illustrate one possible configuration. In these figures, the compliant region 38 comprises a thin web section 110 surrounded by compliant rib walls (ridges) 112, 114 and 116. Both the compliant rib walls 112–116 and the web section 110 provide necessary rigidity to the mount plate 32 against torsion and bending, and at the same time allow the sway compliant region 38 to move (rotate) as the milliactuators 39A and 39B longitudinally expand and contract. It will be seen that the rib walls 112 and 116 are arranged in an angularly alternating zigzag layout to provide the desired sway flexibility. Other rib layouts could also be used. It will also be appreciated that the web section 110 could be formed with one or more openings to further increase the sway compliance of the compliant region 38.

The compliant region 38 can be fabricated in a variety of ways. One way is to create an opening in the mount plate 32 so as to define the rib walls 112, 114 and 116. The web section 110 can then be made by extending the material of the hinge 36 and welding it to the bottom of the mount plate 32 to cover the opening. An alternative construction of the compliant region 38 could be made by partially etching the mount plate 32 to a desired depth greater than the thickness of the milliactuators 39A and 39B. The rib walls 112, 114 and 116 could similarly be formed by partial or full etching, or by blanking. Another alternative construction of the compliant region 38 could be implemented if the mount plate 32 is formed as a laminate structure. In that case, the laminate structure could include a layer made of the material that forms the web section 110. The mount plate 32 could then be partially etched using a chemical etch process or the like to remove mount plate material until only the web section 110 remains within the area that defines the compliant region 38. Other techniques for forming the compliant region 38 could no doubt also be used in accordance with the teachings herein.

Figure 8C:
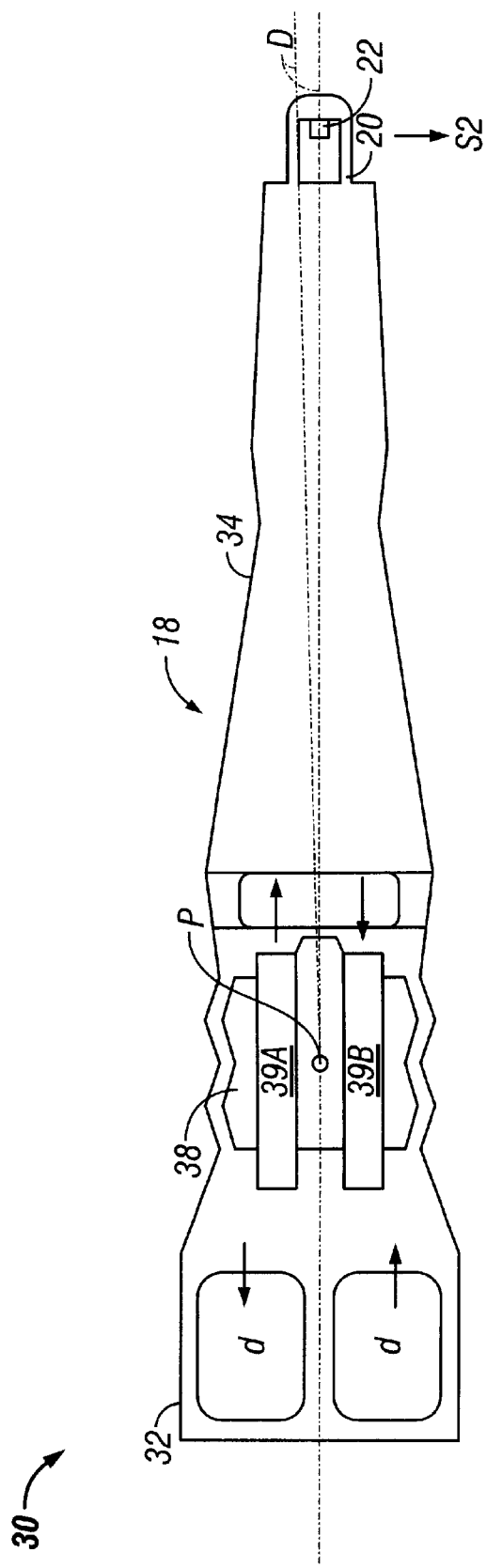

With continuing reference to FIGS. 5 and 6, and with additional reference to FIGS. 8A–8C, the construction of the milliactuators 39A and 39B will now be described. Both of the milliactuators 39A and 39B can be implemented using conventional single or multilayer ceramic piezoelectric actuator elements. The milliactuators 39A and 39B can be mounted on the suspension 18 by bonding them to the web section 110 so the milliactuators span the compliant region 38 longitudinally in a mutually parallel or angular arrangement. Preferably, the milliactuators 39A and 39B are of opposite polarization in order to simplify the electrical connections thereto. For example, in one possible electrical connection arrangement, one side of each milliactuator 39A and 39B could be shorted to the mount plate 32 using conductive epoxy or the like while the other side is wire stitched to an extra power lead (not shown) on the suspension 18. When a voltage differential is applied, one of the milliactuators 39A or 39B is polarized to elongate longitudinally while the other milliactuator is designed to contract longitudinally. As shown in FIGS. 8B and 8C, this will cause the milliactuators to displace the functional end 34 in a sway direction. More particularly, the functional end 34 will pivot about a pivot point whose precise location depends upon the construction details of the suspension 18 but which is assumed to lie at the point labeled with the designation "P" in FIGS. 8A–8C. The direction of the sway motion will depend on the sign of the applied voltage differential. FIG. 8A shows the milliactuators 39A and 39B in a quiescent mode with no applied voltage. FIG. 8B shows the milliactuators 39A and 39B in a first actuated condition due to an applied voltage of a first polarity in which the milliactuator 39A is longitudinally contracted and the milliactuator 39B is longitudinally elongated. This causes the read/write transducer 22 to be displaced in a first sway direction "S1" by a sway stroke offset "D." FIG. 8C shows the milliactuators 39A and 39B in a second actuated condition due to an applied voltage of a second polarity in which the milliactuator 39A is longitudinally elongated and the milliactuator 39B is longitudinally contracted. This causes the read/write transducer 22 to be displaced in a second sway direction "S2" by a sway stroke offset "D." In each of FIGS. 8B and 8C, the length of the actuation stroke of the milliactuators 39A and 39B is given by the designation "d."

The milliactuators 39A and 39B are preferably positioned to provide at least a ten-fold mechanical advantage between the actuating stroke length "d" and the transducer sway stroke offset "D." To achieve a trackwise adjustment capability of four tracks at 100,000 TPI, the transducer sway stroke offset "D" should be at least about 1 micron. To achieve a ten-fold mechanical advantage between the actuating stroke length "d" and the transducer sway stroke offset "D", the actuating stroke length "d" would then be about 0.1 microns.

Figure 1:
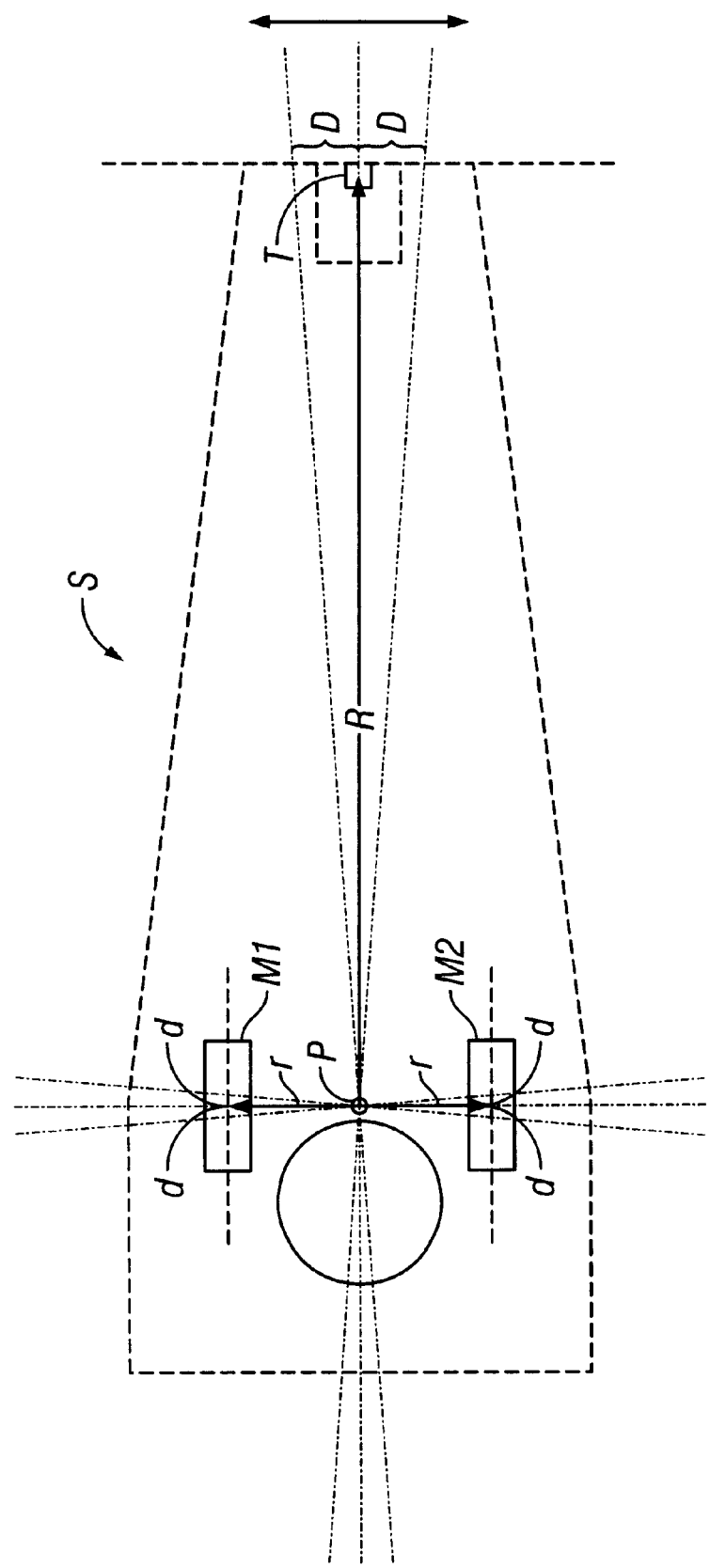
FIG. 1 is a diagrammatic plan view showing the geometry of a prior art milliactuated suspension.

The desired ten-fold mechanical advantage can be achieved by maintaining milliactuators 39A and 39B at a relatively small close spacing or by placing them at a slight angle converging near the hinge 36. As can be seen by way of the geometric relationships shown in FIG. 1, a small spacing between the milliactuators 39A and 39B (with or without angular convergence) will reduce the distance "r" that each milliactuator lies from the pivot point "P." Based on the relationship described by way of background above in which $d=(r*D)/R$, it will be seen that a small value of "r" reduces the milliactuator stroke length required to achieve a desired transducer sway stroke offset "D." If, as per the above, the desired transducer sway stroke offset "D" is 1 micron and the desired milliactuator stroke length is 0.1 microns, the ratio of R/r, where "R" is the distance of the transducer 22 from the pivot point P, will be 10:1. If a future suspension 18 has a shortened length of about 7 millimeters, it may be assumed that the distance "R" will be about 5 millimeters. The desired distance "r" would then be about 0.5 millimeters, which means that the milliactuators should preferably be spaced from each other by a distance of about 1.0 millimeters. It will be seen that such small spacing would not be feasible if a large swage hole was present on the mount plate 32. However, the desired milliactuator spacing is easily achieved using the swageless interconnection design disclosed herein.

Accordingly, a swageless mount plate or unimount arm based milliactuated suspension has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method of manufacturing a disk drive suspension assembly, comprising:
    forming a suspension having a mount plate, a functional end for supporting a slider, a hinge disposed between said mount plate and said functional end, and a sway compliant region on said mount plate;
    said mount plate being free of swage mounting features; and
    mounting said suspension to an actuator arm using a swageless interconnection.

2. A method in accordance with claim 1 wherein said swageless interconnection comprises an adhesive bond.

3. A method in accordance with claim 1 wherein said swageless interconnection comprises a pin or snap connection.

4. A method in accordance with claim 1 wherein said swageless interconnection comprises a damping system provided by a viscoelastic film between said mount plate and said actuator arm.

5. A method in accordance with claim 1 wherein said swageless interconnection comprises said mount plate being integral with said actuator arm to provide a unimount arm configuration.

6. A method in accordance with claim 1 further including mounting a pair of milliactuators on said suspension so as to span said sway compliant region.

7. A method in accordance with claim 6 wherein said milliactuators are positioned to develop at least a ten-fold mechanical advantage between a milliactuator actuating stroke and a transducer sway stroke.

8. A method in accordance with claim 6 wherein said milliactuators are positioned to develop a transducer sway stroke offset of at least about 1 micron on each side of a nominal position of said transducer.

9. A method in accordance with claim 6 wherein said milliactuators are positioned in a mutually parallel relationship.

10. A method in accordance with claim 9 wherein said milliactuators are spaced from each other by a distance of not more than about 1 millimeter.

11. A method in accordance with claim 10 wherein said suspension has an overall length of not more than about 11 millimeters.

12. A disk drive suspension assembly, comprising:

a mount plate;

a functional end for supporting a slider;

a hinge disposed between said mount plate and said functional end;

a sway compliant region on said mount plate;

said mount plate being free of swage mounting features;

a pivotable actuator having an actuator arm; and a swageless interconnection mounting said suspension to said actuator arm.

13. A suspension assembly in accordance with claim 12 wherein said swageless interconnection comprises an adhesive bond.

14. A suspension assembly in accordance with claim 12 wherein said swageless interconnection comprises a pin or snap connection.

15. A suspension assembly in accordance with claim 12 wherein said swageless interconnection comprises a damping system provided by a viscoelastic film between said mount plate and said actuator arm.

16. A suspension assembly in accordance with claim 12 wherein said swageless interconnection comprises said mount plate being integral with said actuator arm to provide a unimount arm configuration.

17. A suspension assembly in accordance with claim 12 further including a pair of milliactuators mounted on said suspension so as to span said compliant region.

18. A suspension assembly in accordance with claim 17 wherein said milliactuators are positioned there is at least a ten-fold mechanical advantage between a milliactuator actuating stroke and a transducer sway stroke.

19. A suspension assembly in accordance with claim 17 wherein said milliactuators are positioned to develop a transducer sway stroke offset of at least about 1 micron on each side of a nominal position of said transducer.

20. A suspension assembly in accordance with claim 17 wherein said milliactuators are positioned in a mutually parallel relationship.

21. A suspension assembly in accordance with claim 20 wherein said milliactuators are spaced from each other by a distance of not more than about 1 millimeter.

22. A suspension assembly in accordance with claim 21 wherein said suspension has an overall length of not more than about 11 millimeters.

23. In a disk drive having a housing, a rotatable data storage medium in housing designed to store data in a series of concentric data tracks, a transducer-carrying slider supported above said data storage medium, and a suspension assembly, said suspension assembly comprising:

a mount plate;

a functional end for supporting said slider;

a hinge disposed between said mount plate and said functional end;

a sway compliant region on said mount plate;

said mount plate being free of swage mounting features;

a pivotable actuator having an actuator arm; and a swageless interconnection mounting suspension to said actuator arm.

24. A disk drive in accordance with claim 23 wherein said swageless interconnection comprises an adhesive bond.

25. A disk drive in accordance with claim 23 wherein said swageless interconnection comprises a pin or snap connection.

26. A disk drive in accordance with claim 23 wherein said swageless interconnection comprises a damping system provided by a viscoelastic film between said mount plate and said actuator arm.

27. A disk drive in accordance with claim 23 wherein said swageless interconnection comprises said mount plate being integral with said actuator arm to provide a unimount arm configuration.

28. A disk drive in accordance with claim 23 further including a pair of milliactuators mounted on said suspension so as to span said compliant region.

29. A disk drive in accordance with claim 28 wherein said milliactuators are positioned there is at least a ten-fold mechanical advantage between a milliactuator actuating stroke and a transducer sway stroke.

30. A disk drive in accordance with claim 28 wherein said milliactuators are positioned to develop a transducer sway stroke offset of at least about 1 micron on each side of a nominal position of said transducer.

31. A disk drive in accordance with claim 28 wherein said milliactuators are positioned in a mutually parallel relationship.

32. A disk drive in accordance with claim 31 wherein said milliactuators are spaced from each other by a distance of not more than about 1 millimeter.

33. A disk drive in accordance with claim 32 wherein said suspension has an overall length of not more than about 11 millimeters.

* * * * *

UNITED STATES PATENT AND TRADEMARK OFFICE
CERTIFICATE OF CORRECTION

PATENT NO. : 6,765,761 B2
DATED : July 20, 2004
INVENTOR(S) : Arya

It is certified that error appears in the above-identified patent and that said Letters Patent is hereby corrected as shown below:

<u>Column 9,</u>
Line 53, insert -- so -- after "positioned."

<u>Column 10,</u>
Line 11, insert -- said -- before "housing."
Line 41, insert -- so -- after "positioned."

Signed and Sealed this

Eighteenth Day of January, 2005

JON W. DUDAS
*Director of the United States Patent and Trademark Office*